Aug. 7, 1928.
T. M. RECTOR
1,679,543
PRESERVED FOOD PRODUCT AND PROCESS
Filed Oct. 10, 1922
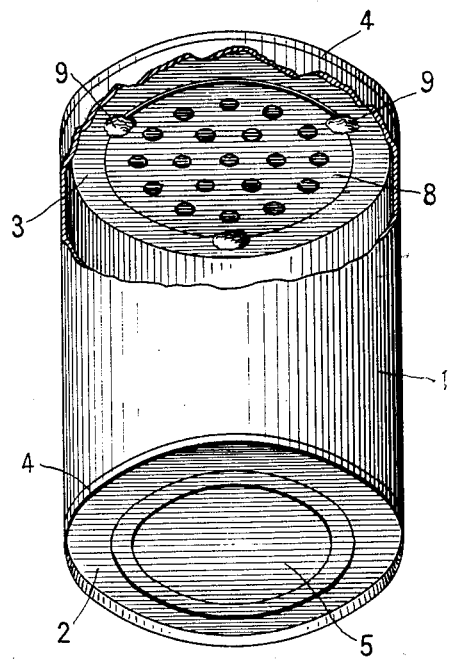
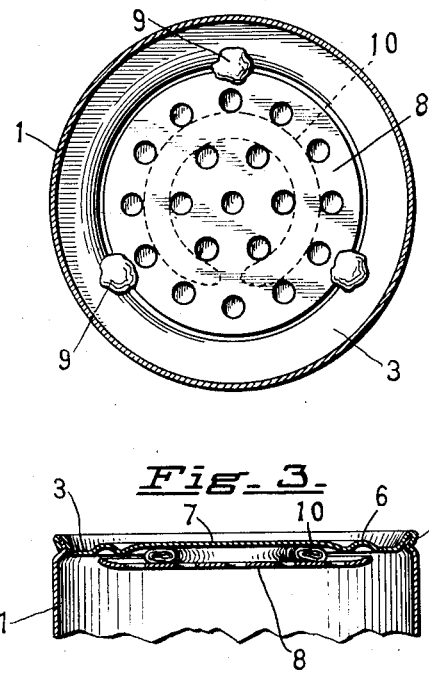
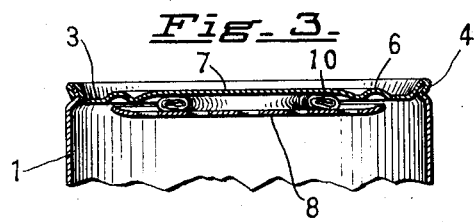
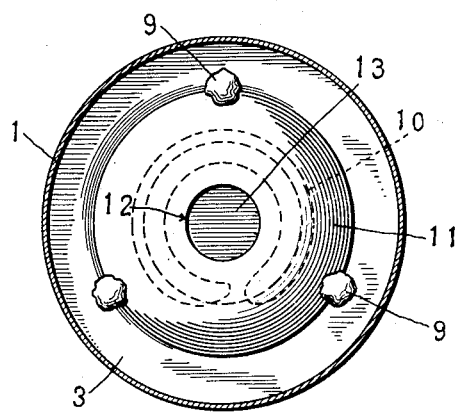
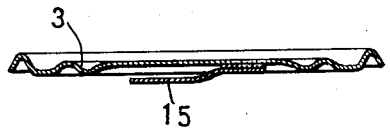
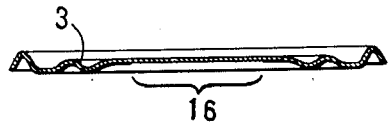
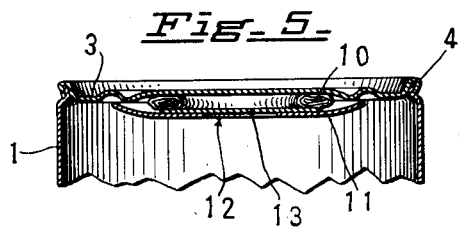

Patented Aug. 7, 1928.

1,679,543

UNITED STATES PATENT OFFICE.

THOMAS M. RECTOR, OF NEW YORK, N. Y., ASSIGNOR TO RECTOR-TENNEY COMPANY INC., OF NEW YORK, N. Y.

PRESERVED-FOOD PRODUCT AND PROCESS.

Application filed October 10, 1922. Serial No. 593,638.

This invention relates generally to the preservation of food or other perishable materials.

In food preserving processes involving the presservation in cans of fish or meat or other relatively moist substances a great deal of trouble is caused by the oxidation and resulting corrosion and blackening of the interior of the can due to the action of oxygen acting in the presence of moisture on imperfectly tinned or otherwise unprotected areas of the inner can surface. The discoloration of the can is readily communicated to the contents and the resulting staining, discoloration and general contamination of the contents of the can obviously result in wastage and loss. Blackening or other discoloration of the can and contents may also be caused by the formation of hydrogen sulphide in products rich in protein, and possibly in other ways.

Also in the case of products containing a considerable amount of liquid tending to chemically act on unprotected portions of the iron trouble is caused by the production of perforations in the wall of the container. Observation indicates that unprotected areas of minute superficial dimensions are particularly subject to attack with resulting perforation and that a greater superficial area of exposed iron produces a correspondingly lessened depth of corrosion with a resulting decrese of actual perforation. The corrosion referred to is believed to be due, in part at least, to the removal of films of oxide, previously formed by action of oxygen on the iron, through the chemical action of fruit acids, or other agencies in the liquid, on the oxide of the metal, in some cases it is possible that the degree of acidity of the liquid is of itself sufficient to produce perforations of unprotected metal without the contribution of the oxidizing feature.

Various special expedients have been resorted to at more or less considerable expense in attempts to overcome the objectionable features referred to. Among these have been included such methods as enameling and lacquering the inside of the can, lining the can with parchment paper, sealing the can in a vacuum, heating the can to boiling, venting and soldering up the hole, or substituting an inert gas for the oxygen-containing atmosphere in the can. In addition to their cost—these methods are relatively complicated and cumbersome to carry out and the results obtained are not invariably satisfactory.

The present invention includes the use of means for taking up or absorbing the deleterious gases remaining in the can following the sealing operation as well as deleterious agencies contained or developed in the contents of the can to thereby prevent corrosion of the inner surface of the container such as produces the undersirable consequences referred to. In order to insure that the elimination of the free deleterious gases from the atmosphere within the can is permanent, I utilize a material having a pronounced selective capacity or affinity for chemically combining with such gases to form a stable compound, but non-injurious to the quality or appearance of the contained food products or other perishable materials, either per se or as the result of chemical activity caused or assisted by it within the container. Examples of such materials are steel wool, cleansed and preferably moistened with salt water or other liquid to facilitate the chemical process. Coating the gas-absorbing material with calcium chloride instead of moistening it with sodium chloride or salt water has a like effect, and, in addition, the hygroscopic properties of the calcium chloride cause the absorption of the available moisture in a nearly dry product—and thereby insure the chemical absorption of the material. I contemplate also the use of other gas-absorbing materials such as aluminum or magnesium or their alloys, as well as other materials whose oxides or other derivatives would not tend to discolor or otherwise injure the contents of the can if accidentally brought into contact therewith. It will be seen that by the use of gas-absorbing means referred to I succeed in turning the water vapor present in the can, and which has heretofore facilitated the undesirable chemical action and corrosion of the can to useful account in that the moisture aids the absorption or chemical combination of the free gases by the gas-absorbing means.

I preferably confine the gas-absorbing material of whatever nature in a cell or container placed within the can and having a wall or walls permeable to the gaseous or liquid content of the can but adapted to prevent the escape of solid material from the cell. The gas-absorbing means may be placed in the can in an unattached condition if desired, but a present preferred method of using it is to attach it to the container and preferably to the cover member of the container as hereinafter shown and described. The gas-absorbing means may be a permanent portion of the can structure such as an exposed area of any portion of the inner surface of the iron body of the can.

In the drawings, in which a preferred embodiment of the invention is illustrated, Figure 1 is a perspective view of a container in which the invention is embodied, the container being partly broken away to show an oxygen-absorbing device attached to the under side of the container cover member;

Figure 2 is a view in cross-section of the can shown in Figure 1 looking toward the inner side of the cover;

Figure 3 is a cross-section taken through Figure 2;

Figure 4 is a view similar to Figure 2 of a modified form of the invention;

Figure 5 is a cross-section taken through Figure 4;

Figure 6 is a view similar to Figure 3 showing still another modification of the invention;

Figure 7 is a view similar to Figure 6 showing still another form of the invention.

Referring to the drawings in greater detail a standard form of can or container 1 is equipped with a bottom end closure member 2 and an upper end closure member 3. The end closure members are crimped at their peripheries to the corresponding ends of the body of the can as at 4 and are additionally secured in place through the use of solder in order to provide a suitably secure hermetic seal. The can may be filled and sealed in any usual or desired manner, preferably by first filling the can and then spinning on the entire top with the gas absorbing means carried thereby or, according to an older practice, filling through an aperture in the bottom closure member 2 which is subsequently closed and sealed by a disk 5 soldered in place.

The top closure member or cover 3 may be particularly formed to support an oxygen-absorbing device on its under surface. A concentric bead 6 and a raised or bulged central portion 7 are formed for this purpose. A holder or cell for the oxygen-absorbing material consists of a concave or saucer-shaped disk 8 soldered to the cover as at 9 and forming with the bulged central portion 7 of the cover a chamber or container for the material which may be represented by a mass of steel wool 10. The peripheral edge of the disk 8 is preferably so related to the bead 6 in the cover as to form a trap to prevent the escape of the steel wool from the cell and at the same time permit the gas and water vapor present in the container to have access to the oxygen-absorbing material 10. Suitable openings or perforations in the disk 8 assist in this operation.

In Figures 4 and 5 of the drawings there is shown a modified form of the invention more particularly adapted for use in cans having liquid or partly liquid contents. In this form of the invention the disk 8 is replaced by a disk 11 having a single centrally located opening or aperture 12 which is closed by a disk of filter paper 13. The filter paper insures the prevention of contact between the oxygen-absorbing material and the contents of the can while allowing access of either gas or liquid to the cell. The filter paper or its equivalent may also be disposed in an enclosing or enveloping relation to the oxygen-absorbing material as will be apparent.

In the modification shown in Figure 6 of the drawings a strip of uncoated sheet iron 15 is attached to the under surface of the can top 3 where it will be exposed to the gaseous atmosphere of the can or to contact with the contents of the can. A like effect may be obtained by providing an exposed or unprotected area of the iron body of the can at any portion of its inner surface. An example of a construction of this nature is indicated at 16 in Figure 7 where a portion of the under surface of the can top 3 is left untinned and exposed. A similar exposed portion maybe provided at any portion of the interior of the can.

In operation such free oxygen or other chemically active gas as remains in the can following the sealing thereof chemically unites with the material in the cell which has been selected for the readiness with which it combines with the deleterious gases. The chemical combining of the gases with the material is facilitated by the water vapor present in the can and by the use of other facilitating agencies as desired. The absorption or combination of the oxygen or other gas with the material in the cell has the desirable effect of eliminating the free undesirable gases from the atmosphere in the can to prevent their direct action on the metal alone or in conjunction with acid or other agencies and thereby prevent oxidation or corrosion of the can and injury to the contents thereof.

I claim:

1. A tin-plate container having therein perishable materials, an uncovered surface of iron being exposed interiorly of the container, of suitable area for the purpose described.

2. A sealed container holding perishable food products, said container having therein an exposed surface of a metallic, absorbing substance of a character that readily unites with deleterious gases that may be present in the can to form relatively stable compounds.

3. A container having therein perishable materials, and an uncoated surface of iron in suitable quantity exposed to the atmosphere within the container, substantially as and for the purpose set forth.

4. In a container for preserving perishable materials, a mass of steel wool carried by the inner surface of the container cover in suitable quantity substantially as and for the purpose set forth.

5. In a container for preserving perishable materials, a receptacle containing a mass of steel wool in suitable quantity carried by the inner surface of the container, and means for preventing the escape of solid material from the receptacle into the container but permitting access to the receptacle of the gaseous vapor and liquid contents of the container.

6. The method of preventing corrosion of the inner surface of sealed containers formed of tin plate which consists in providing an exposed surface of iron within the container of suitable extent for the purpose set forth.

In testimony whereof I affix my signature.

THOMAS M. RECTOR.